United States Patent [19]

Trendell et al.

[11] Patent Number: 5,622,628

[45] Date of Patent: Apr. 22, 1997

[54] TITANIUM DIOXIDE SLURRIES CONCENTRATION

[75] Inventors: Michael J. Trendell, Yarm; Kevin Drury, Stockton on Tees; Stephen R. Spruce, Yarm; Martin R. B. Davis, Guisborough; Keith Robson, Durham, all of England

[73] Assignee: Tioxide Group Services Limited, United Kingdom

[21] Appl. No.: 349,214

[22] Filed: Dec. 5, 1994

[30] Foreign Application Priority Data

Dec. 7, 1993 [GB] United Kingdom ............ 932051

[51] Int. Cl.$^6$ .................................... B01D 61/00
[52] U.S. Cl. ........................ 210/651; 210/650; 423/1; 423/69
[58] Field of Search .................... 210/650, 651, 210/653, 654, 638; 423/1, 69, 79, 72, 81; 204/180

[56] References Cited

U.S. PATENT DOCUMENTS

| | | | |
|---|---|---|---|
| 1,501,587 | 7/1924 | Doremus | 423/72 |
| 3,171,719 | 3/1965 | McKinney | 423/81 |
| 4,107,264 | 8/1978 | Nagasubramanian et al. | 423/81 |
| 4,321,237 | 3/1982 | Panek et al. | 423/69 |
| 4,536,268 | 8/1985 | Lawhorne | 204/182.4 |
| 4,954,262 | 9/1990 | Aoki et al. | 210/651 |
| 5,062,960 | 11/1991 | Aoki et al. | 210/651 |
| 5,118,422 | 6/1992 | Cooper et al. | 210/636 |
| 5,229,339 | 7/1993 | Pujari et al. | 501/96 |
| 5,279,662 | 1/1994 | Smith . | |

FOREIGN PATENT DOCUMENTS

| | | |
|---|---|---|
| 0018706 | 2/1980 | European Pat. Off. . |
| 0035076 | 3/1980 | European Pat. Off. . |
| 0156138 | 2/1985 | European Pat. Off. . |
| 0203713 | 4/1986 | European Pat. Off. . |
| 2103682 | of 0000 | France . |
| 02298393 | of 0000 | Japan . |
| 1400067 | 7/1972 | United Kingdom . |
| 1541968 | 3/1977 | United Kingdom . |
| 1597325 | 3/1978 | United Kingdom . |
| WO90/13606 | 11/1990 | WIPO . |

OTHER PUBLICATIONS

Porter, M. C., A. I. Ch.E. Symp. Ser. 1972 vol. 68, Part 120, pp. 21–30, *Ultrafiltration of Colloidal Suspensions*.

Institution of Chemical Engineers. Symposium Series No. 118, Advances in Separation Processes, 4 Apr. 1990, Swansea pp. 107–118.

W. R. Bowen et al 'properties of microfiltration membrances, part 3' pp. 107–109.

*Primary Examiner*—Ana Fortuna

[57] ABSTRACT

A novel method for the production of titanium dioxide slurries having a high solids content comprises subjecting an aqueous slurry of titanium dioxide to cross-flow filtration to produce a slurry containing at least 50%, preferably 60 to 80% titanium dioxide by weight. The slurry can be washed during filtration to reduce the concentration of soluble ions. The process can produce concentrated slurries of titanium dioxide having remarkably low viscosities.

28 Claims, No Drawings

TITANIUM DIOXIDE SLURRIES CONCENTRATION

The invention relates to the preparation of titanium dioxide slurries and in particular to the concentration of aqueous titanium dioxide suspensions to produce slurries having a high solids content.

The known processes for the production of titanium dioxide pigments usually generate aqueous dispersions of titanium dioxide. Titanium dioxide is frequently separated from these dispersions by, for example, pressure or vacuum filtration to provide a filter cake which is then dried. For many applications, this dried pigment is subsequently redispersed in water for use. This separation and redispersing is clearly wasteful of energy and time. It is advantageous to produce directly a dispersion or slurry of titanium dioxide with a high solids content and such a slurry should desirably have a low viscosity to facilitate handling.

It is an object of the invention to provide a process for the production of a useful high solids slurry of titanium dioxide.

According to the invention, a process for the production of an aqueous slurry of titanium dioxide with a high solids content comprises subjecting a suspension of titanium dioxide particles in water to the effects of cross-flow filtration and continuing the cross-flow filtration process until the suspension contains more than 50 percent by weight titanium dioxide calculated as $TiO_2$.

The term "cross-flow filtration" is herein used to describe a filtration process in which a suspension of solid particles is caused to flow across the surface of a membrane whilst the suspension is subjected to a pressure which tends to cause the fluid medium of the suspension to flow through the membrane which is permeable to the medium but not to the suspended solids. The flow of the suspension across the surface of the membrane minimises any excessive build-up of solids on the surface of the membrane. Mechanical vibration of the surface of the membrane can also be used to enhance the effect of the flowing medium.

In the process of the invention the filtration is continued until the solids content of the suspension is more than 50 percent by weight titanium dioxide. Particularly useful slurries contain from 60 to 80 percent titanium dioxide by weight and the most useful slurries contain from 70 to 80 percent by weight.

A major advantage of the process of the invention is that the slurries produced have a relatively low viscosity despite their high solids content. A very useful product has a solids content of 60 to 80 percent titanium dioxide by weight and a viscosity less than 1.0 Pa s at 20° C., preferably less than 0.4 Pa s at 20° C. Products of the process of the invention containing 70 to 80 percent titanium dioxide and a viscosity less than 0.3 Pa s at 20° C. have been prepared. The most preferred products contain from 70 to 80 percent by weight titanium dioxide and have a viscosity of 0.05 Pa s to 0.2 Pa s at 20° C.

The process of the invention is particularly useful for producing slurries of pigmentary titanium dioxide which is normally in the anatase or rutile crystalline form with an average primary particle size between 0.1 and 0.4 micrometer. Pigmentary rutile titanium dioxide preferably has an average primary particle size between 0.2 and 0.3 micrometer and pigmentary anatase titanium dioxide an average primary particle size between 0.1 and 0.35 micrometer.

The process of the invention is also useful for producing slurries of titanium dioxide which is not pigmentary such as the form of titanium dioxide used as an attenuator of UV light and often called "ultrafine titanium dioxide". "Ultrafine" titanium dioxide preferably has an average primary particle size of from 0.01 to 0.15 micrometer when the particles are substantially spherical. More preferably, the average primary particle size of substantially spherical particles is from 0.01 to 0.06 micrometer. For particles having an acicular shape the average largest dimension of the primary particles is preferably less than 0.15 micrometer and more preferably from 0.02 to 0.1 micrometer.

The solids content of the suspension which is a feedstock for concentration by the process of this invention is frequently less than 35 percent titanium dioxide by weight and a typical suspension generated in the production of pigmentary titanium dioxide has a solids content between 20 and 35 percent by weight.

In the "sulphate" process for the production of titanium dioxide pigments, hydrous titanium dioxide is precipitated from a solution of a titanium sulphate and is usually subsequently subjected to a calcination step to develop the appropriate pigmentary crystal size. The material discharged from the calciner is normally subjected to a milling process to produce a desirable particle size distribution. In the alternative "chloride" process, titanium tetrachloride is reacted with oxygen to produce titanium dioxide. This titanium dioxide is also normally milled to adjust the particle size distribution. The mills used in both the "sulphate" and "chloride" process include bead mills or impact mills.

One form of mill frequently used in the titanium dioxide pigment industry is known as a sand mill in which an aqueous suspension of the calciner discharge or reactor discharge is stirred rapidly in the presence of a grinding medium such as sand. The output or "overflow" from a sand mill comprises a well-dispersed suspension of titanium dioxide which is ideal for use in the process of this invention. The good dispersion is retained during processing to form a high solids, well-dispersed slurry of pigmentary titanium dioxide.

The use of milling for pigmentary titanium dioxide is not, however, an essential feature of this invention and satisfactory high solids slurries can be produced using titanium dioxide directly from a "sulphate" or "chloride" process plant and which has not been subjected to a milling process.

The titanium dioxide used in the process of this invention may be uncoated titanium dioxide obtained as described above directly from the preparative process or it may be titanium dioxide which has been treated, as is common in the pigment industry, by applying a coating of, for example, an inorganic oxide to the surface of the particles. Typical inorganic oxide coatings include silica, alumina, zirconia and titania.

The process of the invention can be operated with a suspension which contains only water and titanium dioxide but it is common practice to add a dispersing agent to a suspension for feeding to a sand mill to assist the milling and the presence of the dispersing agent used in the milling process is believed to be advantageous to the process of this invention. However, when a dispersing agent has been added to the suspension to assist the milling process it is usual not to add any further dispersant for the purpose of carrying out the process of this invention. The dispersing agent may be an inorganic compound such as a phosphate or a silicate or an organic compound such as an alkanolamine. Specific examples of suitable dispersing agents are sodium hexametaphosphate, sodium silicate and monoisopropanolamine.

The amount of dispersing agent used to aid dispersion will depend to some extent upon the chosen dispersing agent but, generally, when a dispersing agent is used, it is present in an amount between 0.05 and 0.4 percent by weight with respect to the titanium dioxide in the suspension.

The process of the invention can be carried out at normal room temperature but it is preferable to operate at a higher temperature such as 30° C. to 80° C. It is most preferable to operate between 40° C. and 70° C.

The precise operating mode of the process of the invention will, to some extent, depend upon factors such as the conductivity, the initial and final solids content of the suspension as well as the surface area of the membrane employed. Normally, however, it is necessary to recirculate the suspension across the membrane a number of times to produce a useful increase in solids content of the suspension from a filtration apparatus of a convenient size. For a batchwise operation, the suspension is typically recirculated from a reservoir across the membrane and returned to the reservoir until the desired concentration has been achieved. The process of the invention can also be operated as a continuous process in which a number of units containing membranes are employed. The initial suspension is passed across the surface of a membrane in a first unit and is recirculated a number of times. A proportion of the slurry is bled to a second unit where it is recirculated over a second membrane system and further concentrated. Any number of units can be linked in this manner to provide an efficient means of obtaining a high solids slurry in a continuous manner.

Water-soluble ions such as sulphate or chloride ions are frequently present in suspensions of titanium dioxide produced on a titanium dioxide pigment plant. Usually, these ions readily diffuse through the filtration membrane and their concentration is lower in the high solids slurry than in the initial suspension. It is advantageous, however, to promote this reduction in ionic concentration by introducing demineralised water into the suspension during the process of the invention. The demineralised water can be introduced in a continuous manner whereby water is added at a rate less than or equal to the rate at which filtrate is removed in the process or in a batchwise process in which the suspension is concentrated by cross-flow filtration, diluted with demineralised water and reconcentrated one or more times. Conveniently, the demineralised water is added in a semi-continuous manner in a series of increments during the concentration process. The reduction of ionic concentration may be performed at any stage of the concentration process and the stage at which it is carried out depends upon the nature of the initial suspension. One particularly useful mode of operation involves concentrating the slurry to between 50 and 60 percent titanium dioxide by weight and then reducing the ionic concentration by adding demineralised water either continuously or semi-continuously whilst the slurry concentration is maintained in the range 50 to 60 percent by weight. When the ionic concentration has been satisfactorily reduced, the slurry is further concentrated to the final concentration selected.

The removal of water-soluble ionic species assists in producing a final slurry having a desirably low viscosity. Usually, the ionic concentration is reduced sufficiently to produce a conductivity in the concentrated slurry of less than 3 mS cm$^1$ and preferably the conductivity of the concentrated slurry is less than 2 mS cm$^1$.

The membrane used in the process of the invention can be any membrane which is suitable for use in cross-flow filtration. Materials from which the membrane can be constructed include porous polymeric materials, porous metals and porous ceramics. A particularly useful membrane comprises a metal mesh composite membrane in which a metal mesh acts as a support for a porous ceramic material such as zirconia. Metal mesh composite membranes are useful employed as a flat sheet although the membrane can take any convenient form such as a cylindrical tube through which or around which the suspension is caused to flow. Metal mesh composite membranes which are spirally wound within a cylindrical tube have been found to be particularly useful.

The pore size of the membrane used in the process of the invention is chosen according to the average size of the particles in the suspension with a view to maximising the rate at which the suspending medium is removed without causing a significant loss of solids or blockages of the pores of the membrane. When the process is operated with a slurry of pigmentary titanium dioxide a nominal pore size between 0.01 and 0.20 micrometer is suitable. Preferably the nominal pore size is between 0.05 and 0.15 micrometer.

The process of the invention is usually operated with a pressure in excess of atmospheric pressure applied to the suspension. The usual parameter used to measure this pressure is known as the transmembrane pressure. The transmembrane pressure is calculated from the expression $$P_t = \tfrac{1}{2}(P_i + P_o) = P_p$$

where $P_t$ is the transmembrane pressure, $P_i$ is the pressure at which the slurry is introduced to the membrane (inlet pressure), $P_o$ is the pressure at which the slurry leaves the membrane (outlet pressure), $P_p$ is the pressure at which the permeate is removed from the filtration unit.

Frequently, the permeate is removed at atmospheric pressure and $P_t$ is then calculated by taking the average of $P_i$ and $P_o$ where these are expressed as gauge pressures.

Generally, a transmembrane pressure between 0.1 MPa and 1.0 MPa is suitable and a transmembrane pressure between 0.2 MPa and 0.4 MPa is preferred.

It is important to maintain the flow of the suspension across the surface of the membrane at a high enough rate to prevent significant build-up of solids on the surface and the velocity used will depend upon the construction of the filtration system used. Typically, a cross-flow velocity above 0.5 meter per second and preferably above 1 meter per second is used. In a laboratory-scale apparatus in which a metal mesh composite membrane is used in the form of a flat sheet a cross-flow velocity above 2 meters per second has been found to be particularly useful. Larger initial cross-flow velocities, above 10 meters per second, have been found useful for larger scale equipment.

The process provides an efficient method of increasing the solids content of a suspension of titanium dioxide. In the laboratory, a 10 liter batch of a suspension of pigmentary titanium dioxide has been concentrated from about 25 weight percent to about 75 weight percent solids with washing to reduce soluble ions in about 6 hours. The slurries produced have low viscosities and settle out only slowly. It is often possible to produce slurries having a higher solids content than slurries produced by known processes such as dispersing dry titanium dioxide and the slurries of the current invention have exceptional stability on storage. The action of pumping the slurry over the surface of the membrane can also reduce the particle size of the titanium dioxide and slurries produced using the process of the invention usually have a narrower particle size distribution than slurries produced using conventional filtration processes. Slurries of pigmentary titanium dioxide are suitable for shipment and can be used directly to prepare, for example, aqueous coating compositions such as emulsion paints, paper or paper coatings or may be utilised as feedstock for processes involving further treatment of the titanium dioxide.

The invention is illustrated by the following examples.

EXAMPLE 1

The starting suspension consisted of uncoated titanium dioxide produced by a "chloride" process which had been subjected to sandmilling in the presence of 0.14% by weight sodium hexametaphosphate based on titanium dioxide. The initial titanium dioxide concentration was 20.6% by weight (245 grams per liter), the pH was 9.5 and the conductivity was 3 mS cm$^{-1}$. This material (14.4 liters in total) was then concentrated, without any "washing" steps, using a laboratory scale cross-flow filtration rig (Ceramesh CML05). This rig used four flat bed membranes with a nominal pore size of 0.1 micrometers covering a total area of 0.04m$^2$, which were connected in series in the cross-flow filtration module. Initially, a transmembrane pressure (TMP) of 0.35 MPa with a cross-flow velocity (CFV) of 2.5 m/s was used. Both these values decreased as the slurry was concentrated to give a TMP of 0.32 MPa and a CFV of 1.8 m/s at 70% TiO$_2$ by weight. At this stage, the pressure was reduced to a TMP of 0.23 MPa and a CFV of 1.4 m/s and the slurry was further concentrated to above 75% solids after a total run time of 400 minutes. The final product contained 78.3% solids by weight (1950 grams per liter), had a pH of 9.4, a conductivity of 1.9 mS cm$^{-1}$ and a viscosity of 0.3 1 Pa s. The mean particle size of the titanium dioxide in the starting suspension was 0.276 micrometer (with a geometric standard deviation of 1.41) and this remained unaltered during the whole concentration process. Settling of this final material was negligible after two weeks and this uncoated material could be incorporated into low TiO$_2$ volume concentration matt paints to produce an opacity comparable to that of a similar paint containing coated and dried pigment.

For comparison, a similar suspension was flocculated at pH 7 using aluminium sulphate and filtered using a Buchner funnel for several days. The resultant cake was redispersed into a high solids cake using minimal amount of a polyacrylate dispersant sold as Dispex GA40. A slurry with a concentration of 78% solids by weight had a viscosity of 1.5 Pa s.

EXAMPLE 2

The starting suspension consisted of uncoated titanium dioxide produced by a "chloride" process and subjected to sandmilling in the presence of 0.13% by weight sodium hexametaphosphate based on titanium dioxide. The titanium dioxide had a relatively high concentration of water soluble ions and the initial suspension contained 33.7% solids by weight (455 grams per liter), had a pH of 8.6 and a conductivity of 4.1 mS cm$^{-1}$. Approximately 11 liters of this material was "washed" on the CML05 rig in two batches, by adding demineralised water at approximately the same rate as the permeate was removed (11.7 liters of wash water in total) until the suspension had a conductivity of 1.4 mS cm$^{-1}$. Four flat bed membranes with a nominal pore size of 0.1 micrometer covering a total area of 0.04 m$^2$, were connected in series in the cross-flow filtration module. The suspension was kept heated at 60° C., using a hot water bath. Initial conditions were a transmembrane pressure (TMP) of 0.36 MPa with a cross-flow velocity (CFV) of 2.3 m/s. The slurry was then concentrated on the rig and the TMP and CFV fell in a similar manner to Example 1 until the TMP was 0.32 MPa and the CFV was 2.0 m/s at a concentration of about 75% solids by weight. The pressure was then reduced to a TMP of 0.26 MPa which was used for the remaining concentration process. The final product, after 400 minutes total run time, contained 79.2% solids by weight (2010 grams per liter), had a pH of 8.6, a conductivity of 1.2 mS cm$^{-1}$ and a viscosity of 0.12 Pa s. The mean particle size of the titanium dioxide in the cross-flow filtration feed was 0.322 micrometer (with a geometric standard deviation of 1.48) and this slightly decreased to 0.305 micrometer (with a geometric standard deviation of 1.45) during the concentration. Settling of this final material was negligible after two weeks and it could be incorporated into low TiO$_2$ volume concentration matt paints to produce an opacity comparable to that of a similar paint containing a coated, dried pigment.

EXAMPLE 3

Calciner discharge from a "sulphate" process titanium dioxide plant was laboratory sandmilled with monoisopropanolamine (0.3% by weight based on titanium dioxide) dispersant to produce a sandmill overflow containing 3 1.4% solids by weight (415 grams per liter) with a pH of 9.9 and a conductivity of 1.8 mS cm$^{-1}$. Approximately 9.4 liters of this material was "washed" on the CML05 rig by adding demineralised water at approximately the same rate as permeate was removed (4 liters of wash water in total), to reduce the salts level and achieve a conductivity of 1.0 mS cm$^{-1}$. Four flat bed membranes with a nominal pore size of 0.08 micrometer covering a total area of 0.04 m$^2$, were connected in series in the cross-flow filtration module. The slurry was heated at 60° C. and, initially, a transmembrane pressure (TMP) of 0.35 MPa and a cross-flow velocity (CFV) of 2.3 m/s were used. The slurry was then concentrated on the rig. TMP and CFV again fell in a similar manner to Example 1. After 390 minutes, the TMP was 0.26 MPa and the run was stopped. The final product contained 73.9% solids by weight ( 1700 grams per liter), had a pH of 8.8, a conductivity of 0.9 mS cm$^{-1}$ and a viscosity of 0.08 Pa s. The mean particle size of the titanium dioxide in the cross-flow filtration feed was 0.273 micrometer (with a geometric standard deviation of 1.34) and this remained unaltered on processing. Settling of this final material was negligible after two weeks and it could be incorporated into low TiO$_2$ volume concentration matt paints to produce an opacity comparable to that of a similar paint containing a coated, dried pigment.

EXAMPLE 4

The starting suspension consisted of uncoated titanium dioxide produced by a "chloride" process which had been subjected to sandmilling in the presence of 0.13% by weight sodium hexametaphosphate based on titanium dioxide. The initial titanium dioxide concentration was 30.3% by weight (395 grams per liter), the pH was 9.6 and the conductivity was 3 mS cm$^{-1}$. This material (14 liters in total) was initially concentrated using a laboratory scale cross-flow filtration rig (Ceramesh CML05). This rig used four flat bed membranes with a nominal pore size of 0.1 micrometer covering a total area of 0.04m$^2$, which were connected in series in the cross-flow filtration module. The suspension was kept heated at 60° C. using a hot water bath. Initially, a transmembrane pressure (TMP) of 0.36 MPa with a cross-flow velocity (CFV) of 2.3 m/s was used. When the slurry had reached 60% solids (1100 grams per liter), the material was "washed" on the CML05 rig by adding demineralised water at approximately the same rate as the permeate was removed (4 liters of wash water in total). The slurry was further concentrated on the rig with the TMP and the CFV falling in a similar manner to Example 1 until the TMP reached 0.31 MPa at a concentration of about 72% solids by weight. The pressure was then reduced to a TMP of 0.26 MPa, which was used for the remaining concentration process. The final product after a total run time of 440 minutes contained 77.6% solids by weight (1910 grams per liter), had a pH of 9.3, a conductivity of 1.1 mS cm$^{-1}$ and a viscosity of 0.13 Pa s. The mean particle size of the titanium dioxide in the starting suspension was 0.302 micrometer (with a geometric standard deviation of 1.32) and this remained virtually unaltered during the whole concentration process (the final slurry had a mean particle size of 0.295 micrometer with a geometric standard deviation of 1.31). Settling of this final material was negligible after two weeks and this uncoated material could be incorporated into low TiO$_2$ volume concentration matt paints to produce an opacity comparable to that of a similar paint containing coated and dried pigment.

EXAMPLE 5

Calciner discharge from a "sulphate" process titanium dioxide plant was plant sandmilled with monoisopropanolamine (0.3% by weight based on titanium dioxide) dispersant to produce a sandmill overflow containing 22.4% solids by weight (270 grams per liter) with a pH of 9.9 and a conductivity of 1.8 mS cm$^{-1}$. The slurry was heated at 60° C. and, initially, a transmembrane pressure (TMP) of 0.36 MPa and a cross-flow velocity (CFV) of 2.3 m/s were used in the CML05 rig. Four flat bed membranes with a nominal pore size of 0.1 micrometer covering a total area of 0.04 m$^2$, were connected in series in the cross-flow filtration module. Approximately 13 liters of this material was initially concentrated on the CML05 rig to 60% solids (1100 grams per liter) and then washed by adding demineralised water at approximately the same rate as permeate was removed (1.5 liters of wash water used here), to reduce the salts level and achieve a conductivity of 1.1 mS cm$^{-1}$. TMP and CFV again fell in a similar manner to Example 1. Washing was completed after 240 minutes and the material was then concentrated to 75% solids (after 350 minutes) when pressure had to be reduced to 0.26 MPa. After 400 minutes, the TMP was 0.26 MPa and the run was stopped. The final product contained 77.5% solids by weight (1905 grams per liter), had a pH of 9.8, a conductivity of 0.9 mS cm$^{-1}$ and a viscosity of 0.2 Pa s. The mean particle size of the titanium dioxide in the cross-flow filtration feed was 0.303 micrometer (with a geometric standard deviation of 1.48) and this remained unaltered on processing. Settling of this final material was negligible after two weeks and it could be incorporated into low TiO$_2$ volume concentration matt paints to produce an opacity comparable to that of a similar paint containing a coated, dried pigment.

EXAMPLE 6

Calciner discharge from a "sulphate" process titanium dioxide plant was plant sandmilled with monoisopropanolamine (0.3% by weight based on titanium dioxide) dispersant to produce a sandmill overflow containing 22.4% solids by weight (270 grams per liter) with a pH of 9.9 and a conductivity of 2.0 mS cm$^{-1}$. The slurry was heated to 60° C. using a water bath. Approximately 12.5 liters of this material was concentrated, without any "washing" steps, on the CML05 rig to high solids. Four flat bed membranes with a nominal pore size of 0.1 micrometer covering a total area of 0.04 m$^2$, were connected in series in the cross-flow filtration module. Initially a TMP of 0.35 MPa with a CFV of 2.3 m/s were used. Both TMP and CFV fell in a similar manner to Example 1 and some pressure reduction was required when the solids reached about 75%. After 320 minutes, the TMP was 0.26 MPa and the run was stopped. The final product contained 77.2% solids by weight (1890 grams per liter), had a pH of 9.2, a conductivity of 1.3 mS cm$^{-1}$ and a viscosity of 0.43 Pa s. The mean particle size of the titanium dioxide in the cross-flow filtration feed was 0.303 micrometer (with a geometric standard deviation of 1.48) and this remained unaltered on processing. Settling of this final material was negligible after two weeks and it could be incorporated into low TiO$_2$ volume concentration matt paints to produce an opacity comparable to that of a similar paint containing a coated, dried pigment.

EXAMPLE 7

Calciner discharge from a "sulphate" process titanium dioxide plant was plant sandmilled with monoisopropanolamine (0.3% by weight based on titanium dioxide) dispersant to produce a sandmill overflow containing 21.7% solids by weight (260 grams per liter) with a pH of 9.5 and a conductivity of 1.4 mS cm$^{-1}$. The slurry was at a temperature of 47° C. and was fed directly into a pilot plant scale cross-filtration rig (designed by NWW Acumem with a useable membrane area 42 times larger than the laboratory CML05 rig). Spirally wound membranes with a nominal pore size of 0.1 micrometer covering a total area of 1.68 m$^2$, were connected in two parallel cylindrical tubes in this cross-flow filtration module. Initially, a transmembrane pressure (TMP) of 0.28 MPa and a cross-flow velocity (CFV) of 15 m/s were used in the pilot scale rig. Approximately 350 liters of the sandmill overflow was concentrated on the rig to 28.5% solids (360 grams per liter) and then washed by adding clean heated water (at about 60° C.) at approximately the same rate as permeate was removed (160 liters of wash water in total), to reduce the salts level and achieve a conductivity of 1.0 mS cm$^{-1}$. Washing was completed after 160 minutes run time and the material was then concentrated to high solids. The pressure had to be constantly reduced as the slurry concentration was increased until the TMP reached its lowest figure of 0.2 MPa at about 60% solids. On concentrating further, the cross-flow velocity had to be reduced and this fell to about 5 m/s after 365 minutes when the run was stopped. The final product contained 79.2% solids by weight (2010 grams per liter), had a pH of 9.5, a conductivity of 1.0 mS cm$^{-1}$ and a viscosity of 0.23 Pa s. The mean particle size of the titanium dioxide in the cross-flow filtration feed was 0.279 micrometer (with a geometric standard deviation of 1.34) and this remained unaltered on processing. Settling of this final material was minimal after two weeks and the product remained stable on standing unagitated for about 3 weeks. Significant settling was, however, noted after 3 weeks. The original product could be incorporated into low TiO$_2$ volume concentration matt paints to produce an opacity comparable to that of a similar paint containing a coated, dried pigment.

EXAMPLE 8

Calciner discharge from a "sulphate" process titanium dioxide plant was plant sandmilled with monoisopropanolamine (0.3% by weight based on titanium dioxide) dispersant to produce a sandmill overflow containing 21.8% solids by weight (260 grams per liter) with a pH of 9.4 and a conductivity of 1.4 mS cm$^{-1}$. The slurry was at a temperature of 50° C. and was fed directly into a pilot plant scale cross-filtration rig (designed by NWW Acumem with a useable membrane area 42 times larger than the laboratory CML05 rig). Spirally wound membranes With a nominal pore size of 0.1 micrometer covering a total area of 1.68 m$^2$, were connected in two parallel cylindrical tubes in this cross-flow filtration module. Initially, a transmembrane pressure (TMP) of 0.24 MPa and a cross-flow velocity (CFV) of 15 m/s were used in the pilot scale rig. Approximately 350 liters of the sandmill overflow was concentrated on the rig to 62% solids (1180 grams per liter) after 165 minutes with constant pressure relief such that the TMP fell to 0.18 MPa at this concentration. The slurry was then "washed" by adding clean heated water (at about 60° C.) at approximately the same rate as permeate was removed (70 liters of wash water in total), to reduce the salts level and achieve a conductivity of 1.0 mS cm$^{-1}$. Washing was completed after 240 minutes total running time and the material was then concentrated to high solids. On concentrating further, the cross-flow velocity had to be reduced and this fell to about 5 m/s after 310 minutes when the run was stopped. The final product contained 79.6% solids by weight (2035 grams per liter), had a pH of 9.2, a conductivity of 1.0 mS cm$^{-1}$ and a viscosity of 0.2 Pa s. The mean particle size of the titanium dioxide in the cross-flow filtration feed was 0.279 micrometer (with a geometric standard deviation of 1.34) and this remained virtually unaltered on processing with the final product having a mean particle size of 0.281 micrometer (with a geometric standard deviation of 1.32). Settling of this final material was negligible after two weeks and it remained stable on standing unagitated for 5–6 weeks before it started to show signs of flocculation. It could be incorporated into low $TiO_2$ volume concentration matt paints to produce an opacity comparable to that of a similar paint containing a coated, dried pigment.

EXAMPLE 9

Calciner discharge from a "sulphate" process titanium dioxide plant was plant sandmilled with monoisopropanolamine (0.3% by weight based on titanium dioxide) dispersant to produce a sandmill overflow containing 22.0% solids by weight (265 grams per liter) with a pH of 10.1 and a conductivity of 1.2 mS cm$^{-1}$. This titanium dioxide slurry had a relatively low concentration of water soluble ions. The slurry was at a temperature of 46° C. and was fed directly into a pilot plant scale cross-filtration rig (designed by NWW Acumem with a useable membrane area 42 times larger than the laboratory CML05 rig). Spirally wound membranes with a nominal pore size of 0.1 micrometer covering a total area of 1.68 m$^2$, were connected in two parallel cylindrical tubes in this cross-flow filtration module. Initially, a transmembrane pressure (TMP) of 0.24 MPa and a cross-flow velocity (CFV) of 15 m/s were used in the pilot scale rig. Approximately 350 liters of the sandmill overflow was concentrated on the rig to 60% solids (1100 grams per liter) after 165 minutes with constant pressure reduction such that the TMP fell to 0.18 MPa at this concentration. The slurry was then "washed" by adding clean heated water (at about 60° C.) at approximately the same rate as permeate was removed (40 liters of wash water in total), to reduce the salts level and achieve a conductivity of 1.0 mS cm$^{-1}$. Washing was completed after 210 minutes total running time and the material was then concentrated to high solids. On concentrating further, the cross-flow velocity had to be reduced and this fell to about 8 m/s after 280 minutes when the run was stopped. The final product contained 79.1% solids by weight (2005 grams per liter), had a pH of 10, a conductivity of 1.0 mS cm$^{-1}$ and a viscosity of 0.12 Pa s. The mean particle size of the titanium dioxide in the cross-flow filtration feed was 0.272 micrometer (with a geometric standard deviation of 1.35) and this remained virtually unaltered on processing with the final product having a mean particle size of 0.263 micrometer (with a geometric standard deviation of 1.36). Settling of this final material was negligible after two weeks and it could be incorporated into low $TiO_2$ volume concentration matt paints to produce an opacity comparable to that of a similar paint containing a coated, dried pigment.

EXAMPLE 10

Calciner discharge from a "sulphate" process titanium dioxide plant was plant sandmilled with monoisopropanolamine (0.3% by weight based on titanium dioxide) dispersant to produce a sandmill overflow containing 21.8% solids by weight (260 grams per liter) with a pH of 10 and a conductivity of 1.2 mS cm$^{-1}$. This titanium dioxide slurry had a relatively low concentration of water soluble ions. The slurry was at a temperature of 45 ° C. and was fed directly into a pilot plant scale cross-filtration rig (designed by NWW Acumem with a useable membrane area 42 times larger than laboratory CML05 rig). Spirally wound membranes with a nominal pore size of 0.1 micrometer covering a total area of 1.68 m$^2$, were connected in two parallel cylindrical tubes in this cross-flow filtration module. The rig was run continuously in a semi-batch operation which was achieved by performing 5 full run cycles using between 800 and 1100 liters of feed in each cycle. Each cycle employed the conditions of Example 9 but with the amount of feed and the consequent run time appropriately scaled. Initially, a transmembrane pressure (TMP) of 0.24 MPa and a cross-flow velocity (CFV) of 15 m/s were used in the pilot scale rig. The required amount of sandmill overflow was concentrated on the rig to 60% solids (1100 grams per liter) with constant pressure reduction such that the TMP fell to 0.18 MPa at this concentration. The slurry was then "washed" by adding clean heated water (at about 60° C.) at approximately the same rate as permeate was removed to reduce the salts level and achieve a conductivity of 1.0 mS cm$^{-1}$. When washing was completed, the material was then concentrated to high solids. On concentrating further, the cross-flow velocity had to be reduced and this fell to about 9 m/s when the product tank was drained with the rig still running. About 40 liters of high concentration slurry was still left in the dead volume in the rig and this was immediately diluted by adding 40 liters of hot water (at about 60° C.) and the tank was further topped up with the original sandmill overflow feed to enable the next cycle to be performed. This procedure was continued for five cycles, producing 470 liters of concentrated slurry product until the run was stopped after 60 hours total run time. The final mixed product contained approximately 77.6% solids by weight (1910 grams per liter), had a pH of 10, a conductivity of 1.0 mS cm$^{31\ 1}$ and a viscosity of 0.10 Pa s. The mean particle size of the titanium dioxide in the cross-flow filtration product was 0.270 micrometer (with a geometric standard deviation of 1.34) and this had remained virtually unaltered from the original feed. Settling of this final material was negligible after two weeks and it could be incorporated into low $TiO_2$ volume concentration matt paints to produce an opacity comparable to that of a similar paint containing a coated, dried pigment.

Material from this experiment was stored in a vessel and intermittently recirculated around the vessel for one hour twice weekly. The slurry properties of this batch were monitored and it was noticed that both viscosity and particle size remained effectively constant for 8 weeks (at 0.10–0.12 Pa s and 0.27–0.28 micrometer respectively). After 9 weeks, the particle size rapidly increased to 0.33 micrometer and the viscosity also increased to about 0.25 Pa s and then to 0.4 Pa s over the next three weeks. This is an indication of the stability of this high concentration slurry but it is believed that the stability time period will increase further if the material is kept fully agitated rather than intermittently agitated.

EXAMPLE 11

Matt paints were made up using the uncoated pigment slurry from the above examples and a control packed pigment (sulphate or chloride-based depending upon the feedstock used to prepare sample pigment slurry) on a weight for weight basis such that weight of titanium dioxide was identical in the two paints. A typical paint example using a 78% solids slurry was:

|  | Parts by weight | | | |
| --- | --- | --- | --- | --- |
|  | Control A | Test A | Control B | Test B |
| Water | 20.81 | 18.35 | 18.21 | 13.53 |
| Thickener (4% Tylose 4000K) | 10.75 | 10.75 | 10.75 | 10.75 |
| Ammonia (0.88) | 0.11 | 0.11 | 0.11 | 0.11 |
| Sodium salt of polycarboxylic acid (Dispex GA40) | 0.67 | 0.67 | 0.67 | 0.67 |
| Coalescing solvent (Texanol) | 1.00 | 1.00 | 1.00 | 1.00 |
| Biocide (Acticide BX) | 0.11 | 0.11 | 0.11 | 0.11 |
| Extender (Snowcal 6 ML) | 34.41 | 34.41 | 34.41 | 34.41 |
| Extender (ITI Talc 20 μm) | 8.60 | 8.60 | 8.60 | 8.60 |
| Titanium dioxide (Tioxide TR92) | 8.71 | — | 16.59 | — |
| Uncoated Pigment Slurry Product | — | 11.17 | — | 21.27 |
| Vinyl acetate/Veova 10 emulsion (Vinamul 6975) | 14.83 | 14.83 | 14.83 | 14.83 |
| Particulate Volume Concentration | 70.1% | 70.0% | 70.1% | 69.9% |
| TiO2 Pigment Volume Concentration | 8.4% | 8.0% | 16.0% | 15.3% |
| Extender Volume Concentration | 61.7% | 62.0% | 54.1% | 54.6% |
| % Volume Solids | 39.4% | 39.3% | 41.0% | 40.8% |
| TEST RESULTS | | | | |
| Chloride process pigment |  | (Example 4) |  | (Example 4) |
| Contrast Ratio (at 20 m²/l) | 91.5 | 91.3 | 94.9 | 95.1 |
| Staining Assessment (1–10 with 1 being least) | 5 | 5 | 5 | 5 |
| Sulphate process pigment |  | (Example 7) |  | (Example 7) |
| Contrast Ratio (at 20 m²/l) | 91.7 | 91.6 | 95.1 | 95.3 |
| Staining Assessment (1–10 with 1 being least) | 5 | 5 | 5 | 5 |

In all examples, the opacity of the uncoated pigment slurry was equivalent to that of the relevant final packed pigment.

We claim:

1. A process for the production of an aqueous slurry of titanium dioxide with a high solids content comprising subjecting a suspension of titanium dioxide particles in water to the effect only of differential trans-membrane pressure, cross-flow filtration and continuing the cross-flow filtration process until the suspension contains more than 50 percent by weight titanium dioxide calculated as $TiO_2$, wherein the suspension which contains more than 50 percent by weight $TiO_2$ has a viscosity of less than 1.0 Pa s at 20° C.

2. A process according to claim 1 in which the cross-flow filtration process is continued until the suspension contains from 60 to 80 percent by weight titanium dioxide calculated as $TiO_2$.

3. A process according to claim 2 in which the suspension contains from 70 to 80 percent by weight titanium dioxide.

4. A process according to claim 1 in which a suspension of titanium dioxide which is a feed-stock for the process contains less than 35 percent by weight titanium dioxide calculated as $TiO_2$.

5. A process according to claim 1 in which a suspension of titanium dioxide which is a feed-stock for the process comprises a discharge slurry from a sand mill of a titanium dioxide pigment plant.

6. A process according to claim 1 in which the titanium dioxide is pigmentary titanium dioxide having an average primary particle size between 0.1 and 0.4 micrometer.

7. A process according to claim 1 in which the titanium dioxide particles are substantially spherical and have an average primary particle size of from 0.01 to 0.15 micrometer.

8. A process according to claim 1 in which the titanium dioxide particles are acicular and have an average largest dimension of primary particles less than 0.15 micrometer.

9. A process according to claim 1 in which the titanium dioxide particles have a surface coating of an inorganic oxide.

10. A process according to claim 1 in which the suspension of titanium dioxide which is a feed-stock for the process contains a dispersing agent.

11. A process according to claim 10 in which the dispersing agent is present in an amount between 0.05 and 0.4 percent by weight with respect to the weight of titanium dioxide in the suspension.

12. A process according to claim 1 in which the cross-flow filtration is carried out at a temperature of from 30° C. to 80° C.

13. A process according to claim 12 in which the filtration is carried out at a temperature of from 40° C. to 70° C.

14. A process according to claim 1 in which the cross-flow filtration is carried out using a transmembrane pressure between 0.1 Mpa and 1.0 Mpa.

15. A process according to claim 1 in which the cross-flow filtration is carried out using a cross-flow velocity greater than 0.5 meter per second.

16. A process according to claim 1 in which a membrane constructed from a material selected from porous polymeric materials, porous metals and porous ceramics is used.

17. A process according to claim 16 in which the membrane comprises a metal mesh composite membrane in which a metal mesh acts as a support for a ceramic material.

18. A process according to claim 17 in which the membrane is spirally wound within a cylindrical tube.

19. A process according to claim 1 in which a membrane having a nominal pore size between 0.01 and 0.20 micrometer is used.

20. A process according to claim 1 in which the viscosity is less than 0.4 Pa s at 20° C.

21. A process according to claim 20 in which the viscosity ranges from 0.05 to Pa s to 0.2 Pa at 20° C.

22. A process for the production of an aqueous slurry of titanium dioxide with a high solids content comprising subjecting a suspension of titanium dioxide particles in water to the effect of cross-flow filtration, in which demineralised water is introduced into the suspension during the cross-flow filtration process thereby lowering the concentration of ions present in the suspension, the demineralised water being introduced either (a) in a continuous manner whereby water is added at a rate less than or equal to the rate at which filtrate is removed in the process, (b) in a batchwise process in which the suspension is concentrated by cross-flow filtration, diluted with demineralised water and reconcentrated one or more times, or (c) in a semi-continuous manner in a series of increments during the process, and continuing the filtration until the suspension contains more than 50 percent by weight titanium dioxide calculated as $TiO_2$.

23. A process according to claim 22 in which the demineralised water is introduced when the suspension has a concentration of between 50 and 60 percent by weight titanium dioxide.

24. A process for the production of an aqueous slurry of titanium dioxide with a high solids content comprising subjecting a suspension of titanium dioxide particles in water to the effect of cross-flow filtration and continuing the cross-flow filtration process until the suspension contains more than 50 percent by weight titanium dioxide calculated as $TiO_2$ and has a conductivity of less than 3 mS cm$^{-1}$.

25. A process according to claim 24 in which cross-flow filtration is continued until the slurry has a conductivity of less than 2 mS cm$^{-1}$.

26. A process for the production of an aqueous slurry of titanium dioxide with a high solids content comprising subjecting a suspension of titanium dioxide particles in water to the effect of cross-flow filtration, introducing demineralised water into the suspension during the filtration so that the concentration of ions present in the water is lowered, and continuing the filtration until the suspension contains more than 50 percent by weight titanium dioxide calculated as $TiO_2$.

27. A process according to claim 26 in which the filtration is continued until the suspension contains from 60 to 80 percent by weight titanium dioxide.

28. A process according to claim 27 in which the filtration is continued until the suspension contains from 70 to 80 percent by weight titanium dioxide.

* * * * *